US012732852B2

(12) United States Patent
Chang et al.

(10) Patent No.: US 12,732,852 B2
(45) Date of Patent: Sep. 8, 2026

(54) PATH SWITCH TO INDIRECT COMMUNICATION THROUGH RELAY UE DEVICE IN RRC CONNECTION STATE OTHER THAN RRC CONNECTED

(71) Applicant: Kyocera Corporation, Kyoto (JP)

(72) Inventors: Henry Chang, San Diego, CA (US); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 200 days.

(21) Appl. No.: 18/569,344

(22) PCT Filed: Jul. 14, 2022

(86) PCT No.: PCT/US2022/037067
§ 371 (c)(1),
(2) Date: Dec. 12, 2023

(87) PCT Pub. No.: WO2023/287947
PCT Pub. Date: Jan. 19, 2023

(65) Prior Publication Data

US 2024/0284545 A1 Aug. 22, 2024

Related U.S. Application Data

(60) Provisional application No. 63/222,303, filed on Jul. 15, 2021.

(51) Int. Cl.
*H04W 24/10* (2009.01)
*H04W 8/00* (2009.01)
(Continued)

(52) U.S. Cl.
CPC ........... *H04W 24/10* (2013.01); *H04W 8/005* (2013.01); *H04W 36/0058* (2018.08);
(Continued)

(58) Field of Classification Search
CPC ..... H04W 76/27; H04W 24/10; H04W 88/04; H04W 72/231; H04W 72/23;
(Continued)

(56) References Cited

U.S. PATENT DOCUMENTS

| | | | |
|---|---|---|---|
| 11,490,448 | B1 | 11/2022 | Kuo |
| 2012/0327801 | A1 | 12/2012 | Seo et al. |

(Continued)

FOREIGN PATENT DOCUMENTS

| | | |
|---|---|---|
| EP | 4 164 327 A1 | 4/2023 |
| WO | 2021/197807 A1 | 10/2021 |

OTHER PUBLICATIONS

Qualcomm Incorporated; "RRC state and essential RRC procedures in L2 U2U relay," R2-2008966; 3GPP TSG RAN WG2 Meeting #112-e; Oct. 23, 2020.

(Continued)

*Primary Examiner* — Wei Zhao
(74) *Attorney, Agent, or Firm* — Studebaker Brackett PLLC

(57) ABSTRACT

A base station transmits a Radio Resource Control (RRC) Reconfiguration message to a remote user equipment (UE) device to initiate a path switch from direct communication with the remote UE device to indirect communication through a relay UE device. The relay UE device is an RRC connection state other than RRC Connected (RRC CONN) when the path switch is initiated. The remote UE device transmits an RRC Reconfiguration Complete message to the base station through the relay UE device. In response to receiving the RRC Reconfiguration Complete message, the relay UE performs RRC Connection Establishment with the base station when the relay UE device is in an RRC IDLE state and performs RRC Resume with the base station when the relay UE device is in an RRC INACTIVE state. The
(Continued)

relay UE device transmits the RRC Reconfiguration Complete message to the base station.

20 Claims, 8 Drawing Sheets

(51) Int. Cl.
*H04W 36/00* (2009.01)
*H04W 40/22* (2009.01)
*H04W 76/23* (2018.01)
*H04W 76/27* (2018.01)
*H04W 88/04* (2009.01)

(52) U.S. Cl.
CPC ........... *H04W 40/22* (2013.01); *H04W 76/23* (2018.02); *H04W 76/27* (2018.02); *H04W 88/04* (2013.01)

(58) Field of Classification Search
CPC ......... H04W 72/0446; H04W 36/0005; H04W 72/232; H04W 72/1263; H04L 1/181; H04L 5/005
See application file for complete search history.

(56) References Cited

U.S. PATENT DOCUMENTS

| | | | | |
|---|---|---|---|---|
| 2015/0031366 | A1* | 1/2015 | Lee | H04W 24/10 455/436 |
| 2018/0070400 | A1 | 3/2018 | Wu et al. | |
| 2018/0092022 | A1 | 3/2018 | Huang et al. | |
| 2018/0110001 | A1 | 4/2018 | Yasukawa et al. | |
| 2018/0139682 | A1 | 5/2018 | Xu et al. | |
| 2018/0184436 | A1 | 6/2018 | Ohtsuji et al. | |
| 2018/0255505 | A1 | 9/2018 | Thyagarajan et al. | |
| 2019/0320361 | A1 | 10/2019 | Uchiyama et al. | |
| 2019/0387446 | A1 | 12/2019 | Xu et al. | |
| 2021/0168779 | A1* | 6/2021 | Mondal | H04L 5/0053 |
| 2022/0264401 | A1 | 8/2022 | Yan et al. | |
| 2022/0330352 | A1 | 10/2022 | Horn et al. | |
| 2023/0063139 | A1 | 3/2023 | Du | |
| 2023/0086337 | A1 | 3/2023 | Sharma et al. | |
| 2023/0180313 | A1 | 6/2023 | Freda et al. | |
| 2023/0397075 | A1 | 12/2023 | Zhao | |
| 2024/0007922 | A1 | 1/2024 | Cheng et al. | |
| 2024/0015809 | A1 | 1/2024 | Cheng et al. | |
| 2024/0064593 | A1 | 2/2024 | Wu et al. | |
| 2024/0147326 | A1 | 5/2024 | Xu et al. | |
| 2024/0155643 | A1* | 5/2024 | Khoshkholgh Dashtaki | H04L 1/1822 |
| 2024/0172084 | A1 | 5/2024 | Xu et al. | |
| 2024/0259906 | A1 | 8/2024 | Freda et al. | |

OTHER PUBLICATIONS

Huawei, Hisilicon; "Discussion on path switch for L2UE to NW Relay," R2-2104132; 3GPP TSG RAN WG2 Meeting #113bis-e; Apr. 2, 2021.
OPPO; "Discussion on service continuity in NR sidelink relay," R2-2104894; 3GPP TSG RAN WG2 Meeting #114e; May 11, 2021.
ZTE, Sanechips; "Discussion on Relay selection in Sidelink relay," R2-2104977; 3GPP TSG RAN WG2 Meeting #114e; May 11, 2021.
Qualcomm Incorporated; "Further discussion on control plane procedures of L2 U2N relay," R2-2104738; 3GPP TSG-RAN WG2 Meeting 114-e; May 19-27, 2021, total 12 pages.
Qualcomm Incorporated; "Service continuity of L2 U2N relay," R2-2104739; 3GPP TSG-RAN WG2 Meeting 114-e; May 19-27, 2021, total 13 pages.
ZTE, Sanechips; "Consideration on service continuity of SL relay," R2-2104979; 3GPP TSG-RAN WG2 Meeting 114-e; May 19-27, 2021, total 7 pages.
Huawei, Hisilicon; "Discussion on service continuity and adaptation layer for L2 UE to NW Relay," R2-2105741; 3GPP TSG-RAN WG2 Meeting 114-e; May 19-27, 2021, total 11 pages.
Kyocera; "Open issues on service continuity for relaying," R2-2108322; 3GPP TSG-RAN WG2 Meeting 115-e; Aug. 9-27, 2021, total 10 pages.
3GPP TS 38.300 V16.6.0 (Jun. 2021); 3rd Generation Partnership Project; Technical Specification Group Radio Access Network; NR; NR and NG-RAN Overall Description; Stage 2 (Release 16); Jun. 2021, total 5 pages.
3GPP TR 38.836 V17.0.0 (Mar. 2021); 3rd Generation Partnership Project; Technical Specification Group Radio Access Network; Study on NR sidelink relay (Release 17); Mar. 2021, total 13 pages.
Mediatek Inc; "Introduction of Rel-17 Sidelink Relay"; R2-2201725; 3GPP TSG-RAN WG2 Meeting #116bis 1 Electronic; Online Meeting; Jan. 17-25, 2022; total 43 pages.

* cited by examiner

PATH SWITCH TO INDIRECT COMMUNICATION THROUGH RELAY UE DEVICE IN RRC CONNECTION STATE OTHER THAN RRC CONNECTED

CLAIM OF PRIORITY

The present application claims priority to Provisional Application No. 63/222,303, entitled "SERVICE CONTINUITY UNDER L2 SIDELINK RELAYING," filed Jul. 15, 2021, which is assigned to the assignee hereof and hereby expressly incorporated by reference in its entirety.

FIELD

This invention generally relates to wireless communications and more particularly to management of wireless communication links using relay devices.

BACKGROUND

Many wireless communication systems that employ several base stations that provide wireless service to user equipment (UE) devices enable sidelink communication between two or more UE devices where the UE devices can communicate directly with other UE devices. With sidelink communication, UE devices transmit data signals to each other over a communication link using the cellular resources instead of through a base station. Such Proximity Services (ProSe) communication is sometimes also referred to as device-to-device (D2D). In addition, one or more UE devices can be used as relay devices between a UE device and a destination where the relay device forwards data between a UE device and the destination. The destination may be a communication network or another UE device (destination UE device). Where the destination is the network, the relay functionality is typically referred to as UE-to-Network (U2N) relaying and the relay UE device establishes a communication path between the remote UE and a base station (gNB) or cell. In some situations, for example, the UE device may be out of the service area of the base station and the relay UE device provides a communication link routed from such an out-of-coverage (OoC) UE device through a relay UE device to the base station. Where the destination device is another UE device (target UE device), the relaying functionality is typically referred to as UE-to-UE (U2U) relaying.

SUMMARY

A base station transmits a Radio Resource Control (RRC) reconfiguration with Sync message to a remote user equipment (UE) device to initiate a path switch from direct communication with the remote UE device to indirect communication through a relay UE device. The relay UE device is an RRC connection state other than RRC Connected (RRC CONN) when the path switch is initiated. The remote UE device transmits an RRC Reconfiguration Complete message to the base station through the relay UE device. In response to receiving the RRC Reconfiguration Complete message, the relay UE performs RRC Connection Establishment with the base station when the relay UE device is in an RRC IDLE state and performs RRC Resume with the base station when the relay UE device is in an RRC INACTIVE state. The relay UE device transmits the RRC Reconfiguration Complete message to the base station over a Uu communication link.

DETAILED DESCRIPTION

Figure 1A:
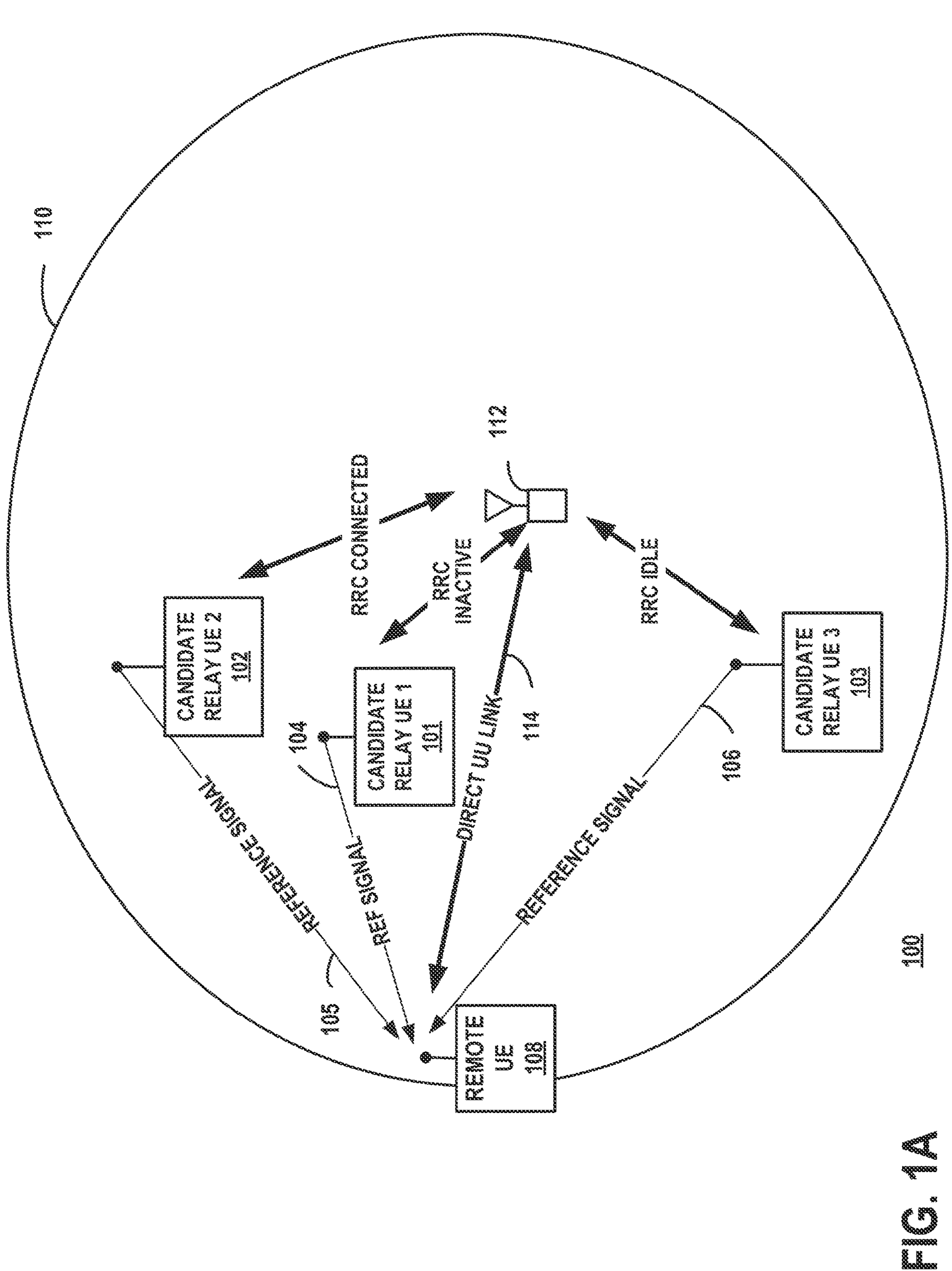
FIG. 1A is a block diagram of a communication system for an example where candidate relay UE devices transmit reference signals that are received by a remote UE device 108 where the candidate relay UE devices may be in any one of RRC connected states.

As discussed above, a relay UE device provides connectivity between a remote UE device and a destination which can be another UE device (destination UE device) or a network. Where the destination is the network, the relay provides connectivity to a cell provided by a base station (gNB) of the network. The relayed connection between a remote UE device and target UE device is sometimes referred to as a UE to UE (U2U) relay connection. The relayed connection between a remote UE device and a base station (gNB) is sometimes referred to as a UE to network (U2N) relay connection. In some situations, the ultimate destination is a target UE device through the base station. In conventional systems where the relay connects to a base station (gNB), the relay UE device is required to meet certain criteria to function as a relay. For example, the relay UE device must be in coverage and have a cellular (Uu) communication link to the base station of sufficient quality in order to be available for U2N relaying functions.

Sidelink relaying functionality allows a remote UE that is out-of-coverage (OoC) to connect with the gNB or base station via a relay UE device. With UE-to-Network (U2N) relaying, the relay UE needs to be in coverage of a cell and connected to the gNB. The relayed connection from the remote UE device to the base station (gNB) includes a PC5 link (sidelink) between the remote UE device and the relay UE device and the Uu link between the relay UE device and the gNB.

In some situations, a remote UE device is in direct communication with a base station (gNB) without communicating through a relay UE device, and the base station determines that the communication link to the remote UE device should be switched from the direct link to an indirect link through a relay UE device. In making the switch to an indirect link, however, the base station may choose to switch to an indirect relayed link provided by a relay UE device that is in an RRC state other than the RRC Connected state (RRC CONN). Latency may be minimized when switching to a relayed connection through a relay UE device in RRC CONN as compared to switching to a relayed connection through a relay UE device in an RRC idle state (RRC IDLE) or an RRC inactive state (RRC INACTIVE). In some situations, however, the path through the relay in RRC IDLE or RRC INACTIVE may be preferred. Accordingly, the base station may select the better path at the expense of latency. In other situations, a relay in RRC CONN may not be available, and the only indirect options include relays in IDLE or INACTIVE, since it is typically more power efficient to keep relay UE devices in IDLE or INACTIVE when there are no remote UE devices PC5-connected to the relay UE device. Also, current communication standards do not specify that the remote UE device limits the pool of candidate relay UE devices contained in the measurement report to any particular RRC state such as RRC CONN and do not specify that the remote UE indicates the states of the candidate relay UE devices listed in the measurement report.

For the examples herein, the base station sends an RRC Reconfiguration with Sync message to a remote UE device to initiate a path switch from direct link to an indirect link through a relay UE device that is currently in an RRC state other than RRC CONN. The remote UE sends an RRC Reconfiguration Complete message to the base station through the relay UE device, which triggers a procedure to transition the relay UE device to RRC CONN. In response to receiving the RRC Reconfiguration Complete message, the relay UE performs RRC Connection Establishment with the base station when the relay UE device is in an RRC IDLE state and performs RRC Resume with the base station when the target relay UE device is in an RRC INACTIVE state. The relay UE device transmits the RRC Reconfiguration Complete message to the base station over the Uu communication link.

Although the techniques discussed herein may be applied to various types of systems and communication specifications, the devices of the example operate in accordance with at least one revision of the 3rd Generation Partnership Project (3GPP) New Radio (NR) V2X communication specification. The techniques discussed herein, therefore, may be adopted by one or more future revisions of communication specifications although the techniques may be applied to other communication specifications where sidelink or D2D is employed. More specifically the techniques may be applied to current and future releases of 3GPP NR specifications. For example, the techniques may also be applied to 3GPP NR (3GPP Rel-17) and 3GPP Rel-18.

FIG. 1A is a block diagram of a communication system 100 for an example where candidate relay UE devices 101-103 transmit reference signals 104-106 that are received by a remote UE device 108 where the candidate relay UE devices 101-103 may be in any one of RRC connected states. The candidate relay UE device 101-103 are within a cell coverage area 110 of a base station (gNB) 112. For the example, the first candidate relay UE device 101 is in the RRC inactive state (RRC INACTIVE), the second candidate relay UE device 102 is in the RRC connected state (RRC CONN), and the third candidate relay UE device 103 is in the RRC idle state (RRC IDLE).

The remote UE device 108 is in communication with the base station 112 over a direct Uu communication link 114. The remote UE device 108, therefore, is within the cell coverage area 110 when the scenario of the example discussed with reference to FIGS. 1A-D begins. The remote UE device 108 receives a reference signal 104, 105, 106 from each of the relay UE candidate devices 101, 102, 103. For the example, the reference signals 104-106 are sidelink discovery signals where the discovery signal may be a Model A discovery announcement message or a Model B response message.

Figure 1B:
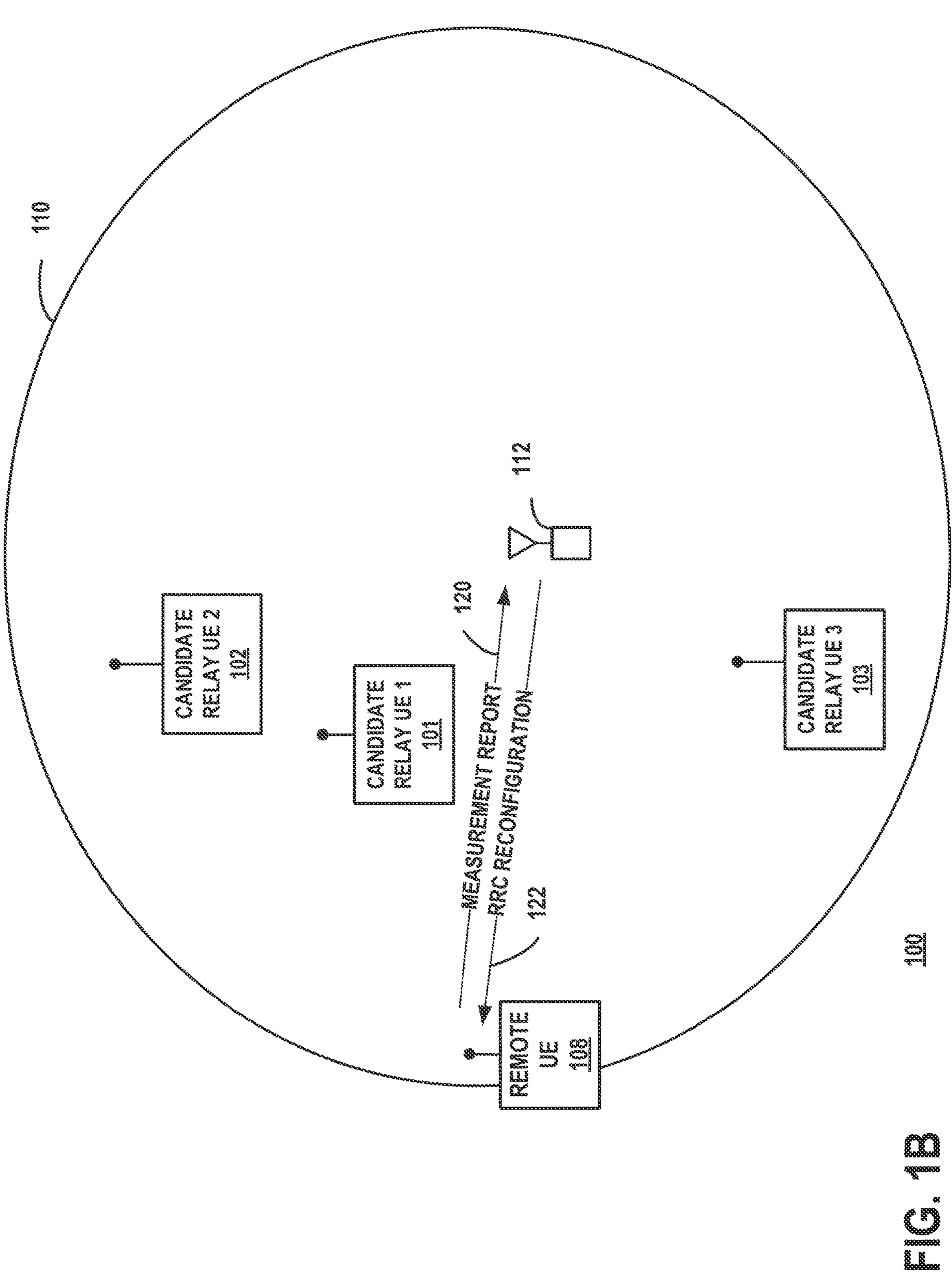
FIG. 1B is a block diagram of the communication system where the remote UE device transmits a measurement report to the base station.

FIG. 1B is a block diagram of the communication system 100 where the remote UE device 108 transmits a measurement report 120 to the base station 112. The remote UE device 108 generates the measurement report 120 based on measurements of the reference signals 104-106 received at the remote UE device 108. For the example, the measurement report 120 is generated in accordance with at least one revision of the 3GPP communication specification. The base station 112 receives the measurement report and determines that the remote UE device 108 should switch from the direct communication path to the base station 112 to an indirect communication path through a relay UE device. For the example, the base station 112 selects the candidate relay UE device 101 as the target relay UE device for the indirect communication path. The base station transmits an RRC Reconfiguration with Sync message 122 instructing the remote UE device 108 to switch to the indirect path through the candidate relay UE device 101. For the example discussed with reference to FIGS. 1A-D, therefore, the target relay UE device is in RRC INACTIVE when the remote UE device 108 receives the RRC Reconfiguration with Sync message 122.

Figure 1C:
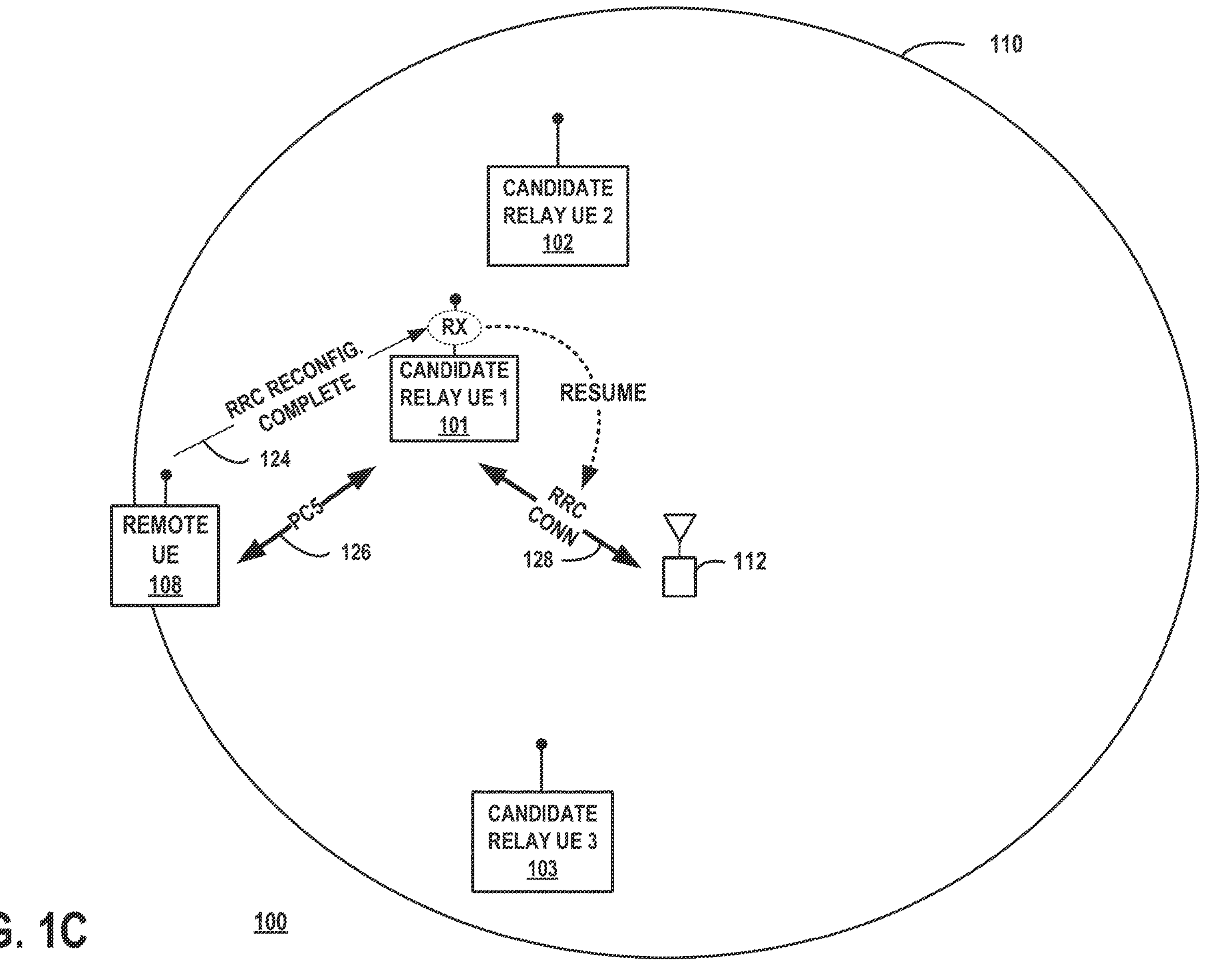
FIG. 1C is a block diagram of the communication system where the remote UE device transmits an RRC Reconfiguration Complete message to the target relay UE device for relaying to the base station.

FIG. 1C is a block diagram of the communication system 100 where the remote UE device 108 transmits an RRC Reconfiguration Complete message 124 to the target relay UE device (candidate relay UE device 101) for relaying to the base station 112. In response to receiving the RRC Reconfiguration with Sync message 122, the remote UE device establishes a sidelink (PC5 link) 126 with the candidate relay UE device 101. After the PC5 link is established, the remote UE device 108 transmits an RRC Reconfiguration Complete message 124 using the default configuration of SL-RLC1 to the candidate relay UE device 101 and intended for the base station 112. In response to receiving the RRC Reconfiguration Complete message 124, the target relay UE device 101 performs a procedure to resume the RRC CONN state with the base station 112. For the example, the target relay UE device 101 performs the resume procedure in accordance with at least one revision of the 3GPP communication specification, which typically includes at least transmitting an RRC Resume Request message to the base station 112, receiving an RRC Resume message from the base station 112, and transmitting an RRC Resume Complete message to the base station 112. After the procedure is performed, the RRC CONN state 128 is resumed.

In situations where the target relay UE device is a candidate relay UE device in RRC IDLE, the candidate relay UE device performs an RRC connection establishment procedure. If the target relay UE device is the candidate relay UE device 103, for example, the candidate relay UE device 103 performs an RRC establishment procedure in accordance with at least one revision of the 3GPP communication specification, which typically includes transmitting an RRC Establishment Request message to the base station 112, receiving an RRC Reconfiguration message from the base station 112, and transmitting an RRC Reconfiguration Complete message to the base station 112.

Figure 1D:
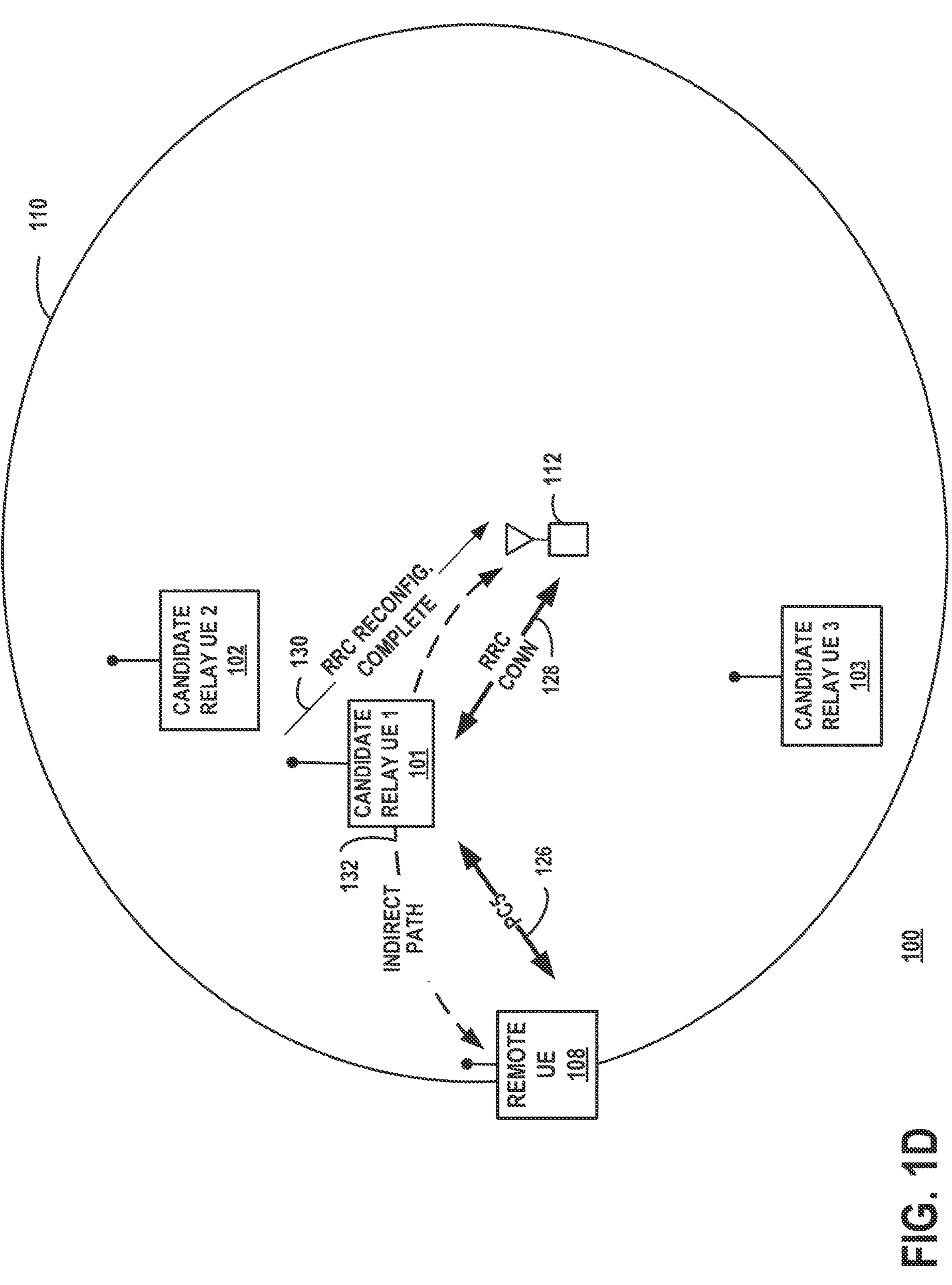
FIG. 1D is a block diagram of the communication system where the target relay UE device forwards the RRC Reconfiguration Complete message as an RRC Reconfiguration complete transmission to the base station.

FIG. 1D is a block diagram of the communication system 100 where the target relay UE device (candidate relay UE device 101) forwards information related to the RRC Reconfiguration Complete message 124 in a remote reconfiguration complete relayed transmission 130 to the base station 112. After RRC CONN is resumed with the base station 112, the target relay UE device (candidate relay UE device 101) relays the Reconfiguration Complete message 124 to the base station 112, and the indirect communication path 132 between the remote UE device 108 and the base station 112, through the relay UE device 101, is established. For the example, the remote reconfiguration complete relayed transmission 130 is a Signaling Radio Bearer 1 (SRB1) message transmitted using Sidelink Relay Adaptation Protocol (SRAP) techniques.

Figure 2:
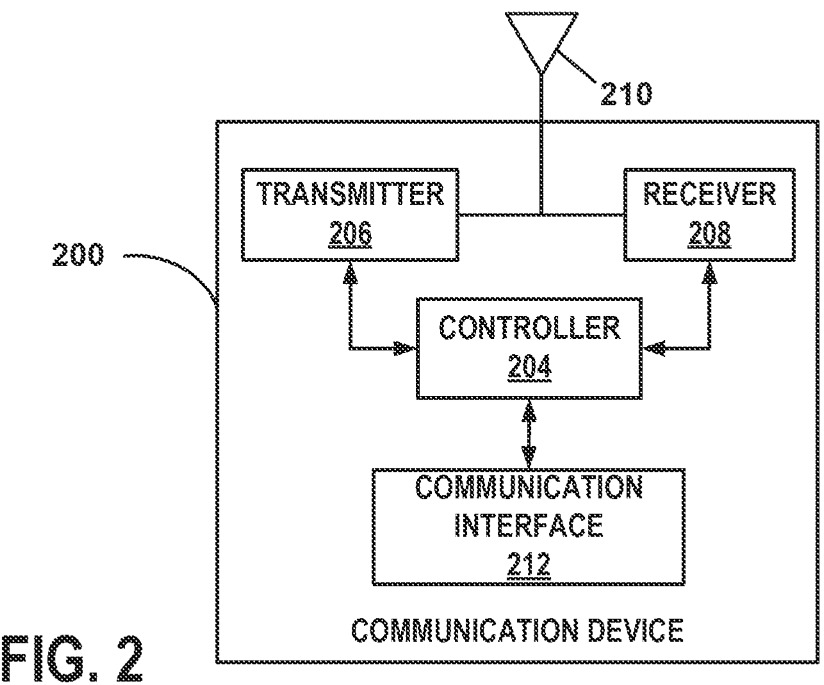
FIG. 2 is a block diagram of an example of a base station.

FIG. 2 is a block diagram of an example of a base station 200 suitable for use as the base station 112 and any base station providing a cell or otherwise serving any of the UE devices. The base station 200 includes a controller 204, transmitter 206, and receiver 208, as well as other electronics, hardware, and code. The base station 200 is any fixed, mobile, or portable equipment that performs the functions described herein. The various functions and operations of the blocks described with reference to the base stations 112, 200 may be implemented in any number of devices, circuits, or elements. Two or more of the functional blocks may be integrated in a single device, and the functions described as performed in any single device may be implemented over several devices. The base station 200 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 200 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 200 may be a portable device that is not fixed to any particular location.

The controller 204 includes any combination of hardware, software, and/or firmware for executing the functions described herein as well as facilitating the overall functionality of the base station 200. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2 perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals and can apply any one of a plurality of modulation orders. The demodulator demodulates any uplink signals received at the base station 200 in accordance with one of a plurality of modulation orders.

The base station 200 includes a communication interface 212 for transmitting and receiving messages with other base stations. The communication interface 212 may be connected to a backhaul or network enabling communication with other base stations. In some situations, the link between base stations may include at least some wireless portions. The communication interface 212, therefore, may include wireless communication functionality and may utilize some of the components of the transmitter 206 and/or receiver 208.

Figure 3:
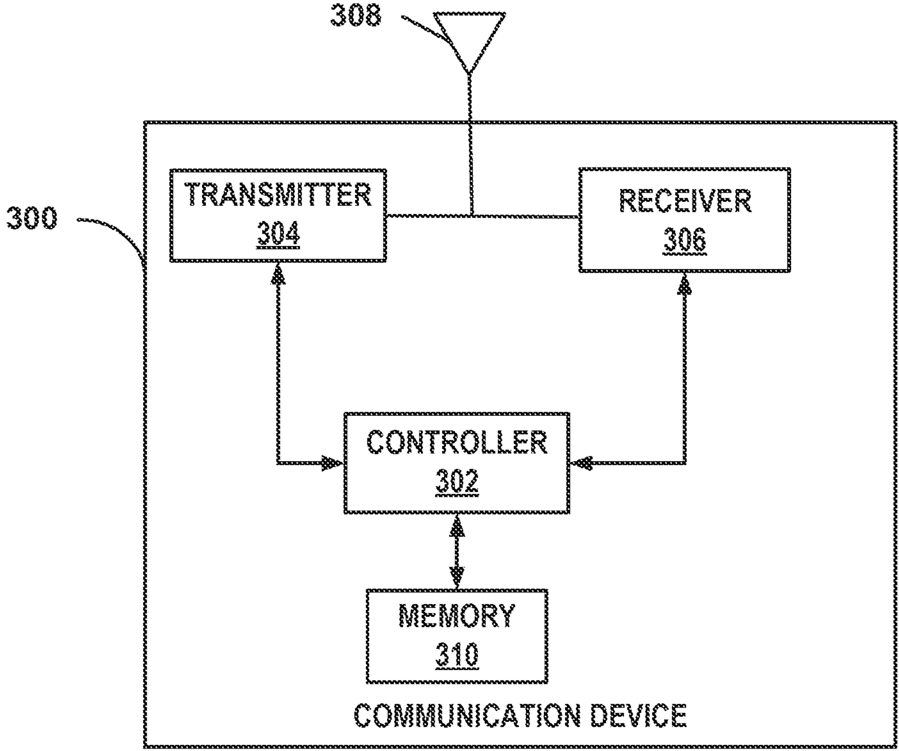
FIG. 3 is a block diagram of an example of a UE device suitable for use as each of the UE devices.

FIG. 3 is a block diagram of an example of a UE device 300 suitable for use as each of the UE devices 101-103, 108. In some examples, the UE device 300 is any wireless communication device such as a mobile phone, a transceiver modem, a personal digital assistant (PDA), a tablet, or a smartphone. In other examples, the UE device 300 is a machine type communication (MTC) device or Internet-of-Things (IoT) device. The UE device 300, therefore is any fixed, mobile, or portable equipment that performs the functions described herein. The various functions and operations of the blocks described with reference to UE device 300 may be implemented in any number of devices, circuits, or elements. Two or more of the functional blocks may be integrated in a single device, and the functions described as performed in any single device may be implemented over several devices.

The UE device 300 includes at least a controller 302, a transmitter 304 and a receiver 306. The controller 302 includes any combination of hardware, software, and/or firmware for executing the functions described herein as well as facilitating the overall functionality of a communication device. An example of a suitable controller 302 includes code running on a microprocessor or processor arrangement connected to memory. The transmitter 304 includes electronics configured to transmit wireless signals. In some situations, the transmitter 304 may include multiple transmitters. The receiver 306 includes electronics configured to receive wireless signals. In some situations, the receiver 306 may include multiple receivers. The receiver 306 and transmitter 304 receive and transmit signals, respectively, through antenna 308. The antenna 308 may include separate transmit and receive antennas. In some circumstances, the antenna 308 may include multiple transmit and receive antennas.

The transmitter 304 and receiver 306 in the example of FIG. 3 perform radio frequency (RF) processing including modulation and demodulation. The receiver 306, therefore, may include components such as low noise amplifiers (LNAs) and filters. The transmitter 304 may include filters and amplifiers. Other components may include isolators, matching circuits, and other RF components. These components in combination or cooperation with other components perform the communication device functions. The required components may depend on the particular functionality required by the communication device.

The transmitter 304 includes a modulator (not shown), and the receiver 306 includes a demodulator (not shown).

The modulator can apply any one of a plurality of modulation orders to modulate the signals to be transmitted as part of the uplink signals. The demodulator demodulates the downlink signals in accordance with one of a plurality of modulation orders. The communication device 300 includes memory 310 in addition to memory that is part of the controller 302. Information such as a candidate relay prioritization list, which may be included in the remote reconfiguration complete relayed transmission 130, may be stored and maintained on the memory 310, the controller 302, or a combination of the two.

Figure 4A:
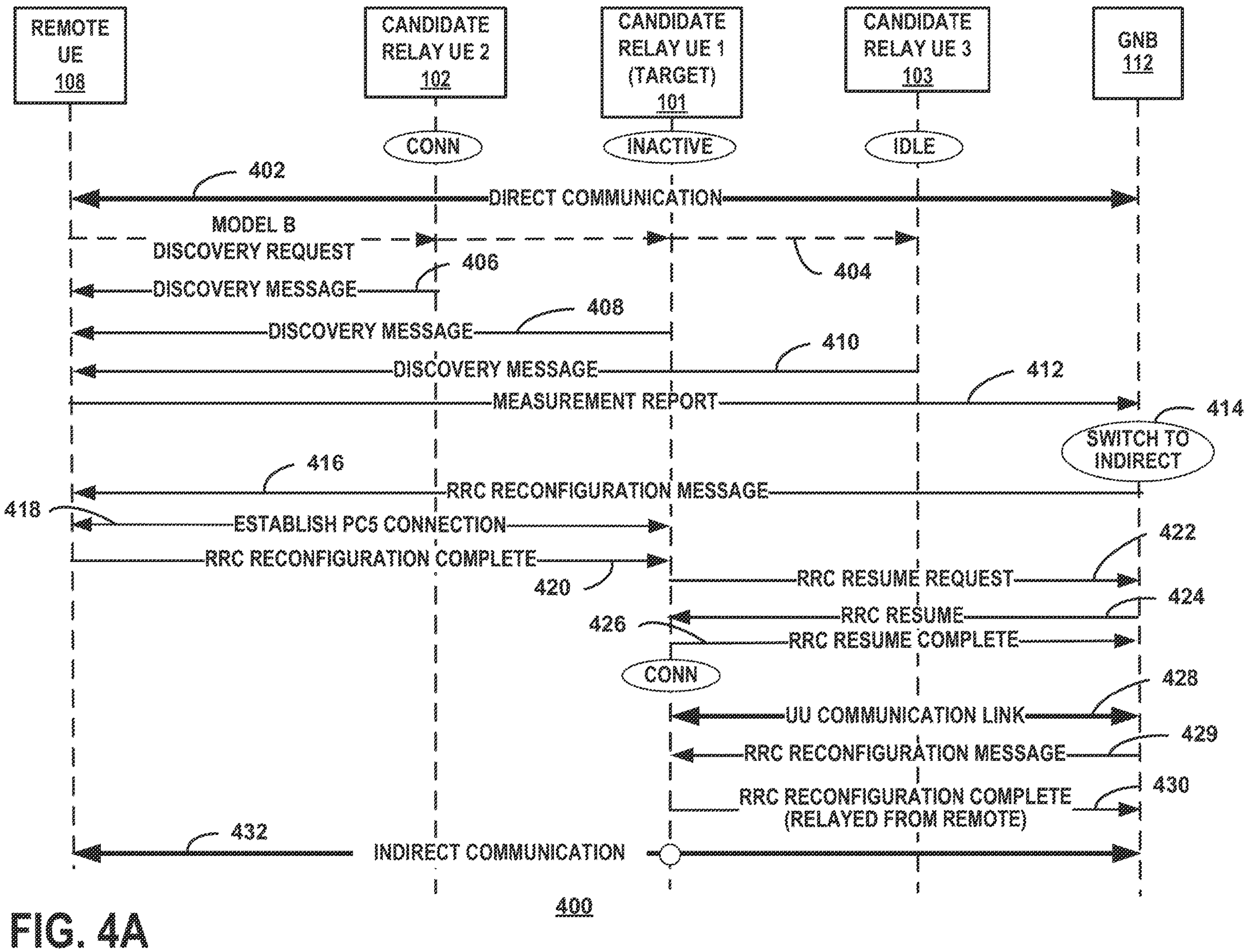
FIG. 4A is a message diagram for an example of relay link management for direct to indirect path switching where the target relay UE device is in RRC INACTIVE.

FIG. 4A is a message diagram 400 for an example of relay link management for direct to indirect path switching where the target relay UE device is in RRC INACTIVE. Although FIG. 4A shows three candidate relay UE devices 101-103, any number of candidate relay devices may be involved in the messaging. The example begins with the remote UE device 108 in direct communication 402 with the base station (gNB) 112 and with the first candidate relay UE device 101 in the RRC inactive state (RRC INACTIVE), the second candidate relay UE device 102 in the RRC Connected state (RRC CONN), and the third candidate relay UE device 103 in the RRC idle state (RRC IDLE). Uplink data and downlink data are exchanged between the remote UE device 108 and the gNB 112 over the direct Uu communication link 402.

At transmission 404, a Model B discovery request is sent from the remote UE device 108 to the nearby candidate relay UE devices. In some situations, the Model B discovery request may be omitted. Accordingly, the arrow representing the Model B discovery request is illustrated with a dashed line to indicate that the transmission may not be needed. For example, where Model A discovery messages are received from the candidate relay UE devices, the Model B request may not be needed.

At transmission 406, a discovery message is sent from the candidate relay UE device 102. At transmission 408, a discovery message is sent from the candidate relay UE device 101. At transmission 410, a discovery message is sent from the candidate relay UE device 103. The discovery messages of the transmissions 406, 408, 410 may be Model A discovery announcement messages or may be Model B discovery response messages. The remote UE device 108 receives the discovery messages and evaluates received signals and information as part of the relay reselection procedure. For the examples, the remote UE device 108 measures the Sidelink Discovery Reference Signal Received Power (SD-RSRP) levels of the received discovery messages.

At transmission 412, the remote UE device 108 sends a measurement report to the gNB 112 where the measurement report includes signal quality measurements for candidate relay devices. Accordingly, the measurement report includes the signal quality measurements, such as the SD-RSRP levels, of the discovery signals 406, 408, 410.

At event 414, the gNB 112 determines that communication with the remote UE device 108 should be switched from a direct connection to an indirect connection via a target relay UE device. The decision by the gNB 112 to switch to indirect communication may be based on any combination of factors, such as which event triggered the measurement reporting, the SD-RSRP level(s), the RRC connection status, and the congestion level of the candidate relay UE (the gNB may know how many remote UE devices are already connected to a particular candidate relay UE). For the example of FIG. 4A, the gNB 112 selects candidate relay UE device (UE 1) 101 as the target UE device.

At transmission 416, the gNB 112 transmits an RRC Reconfiguration with Sync message to the remote UE device 108. The RRC Reconfiguration with Sync message initiates the switch from the direct communication link 402 to an indirect communication link via the target candidate relay UE device 101.

At event 418, a PC5 connection is established between the remote UE device 108 and the target candidate relay UE device 101. In some situations, the PC5 connection may already be established, and event 418 is not needed.

At transmission 420, the remote UE device 108 sends an RRC Reconfiguration Complete message intended for the gNB 112 via the candidate relay UE device 101. The RRC Reconfiguration Complete message 420 is received at the target relay UE device 101 over the PC5 link.

In response to receiving the RRC Reconfiguration Complete message 420, the target relay UE device 101 begins the RRC Resume procedure by transmitting the RRC Resume Request at transmission 422.

The target relay UE device 101 and gNB 112 exchange messages to resume RRC CONN. For the example, the gNB 112 sends an RRC Resume message at transmission 424, and the target relay UE device 101 sends an RRC Resume Complete message 426. When the target relay UE device 101 is in RRC CONN, a Uu communication link 428 is established between the target relay UE device 101 and gNB 112.

At transmission 429, the gNB 112 sends an RRC Reconfiguration message to the target relay UE device 101 to configure both the sidelink Radio Link Control (RLC) configuration, the RLC configuration in the Uu link and the remote UE identifier (ID) to be used for the relay operation.

The target relay UE device 101 relays the RRC Reconfiguration Complete message received from the remote UE device 108 to the gNB 112 at transmission 430. Communication between the remote UE device 108 and the gNB 112 continues over the indirect communication link 432, which includes a relay connection through the relay UE device 101.

Figure 4B:
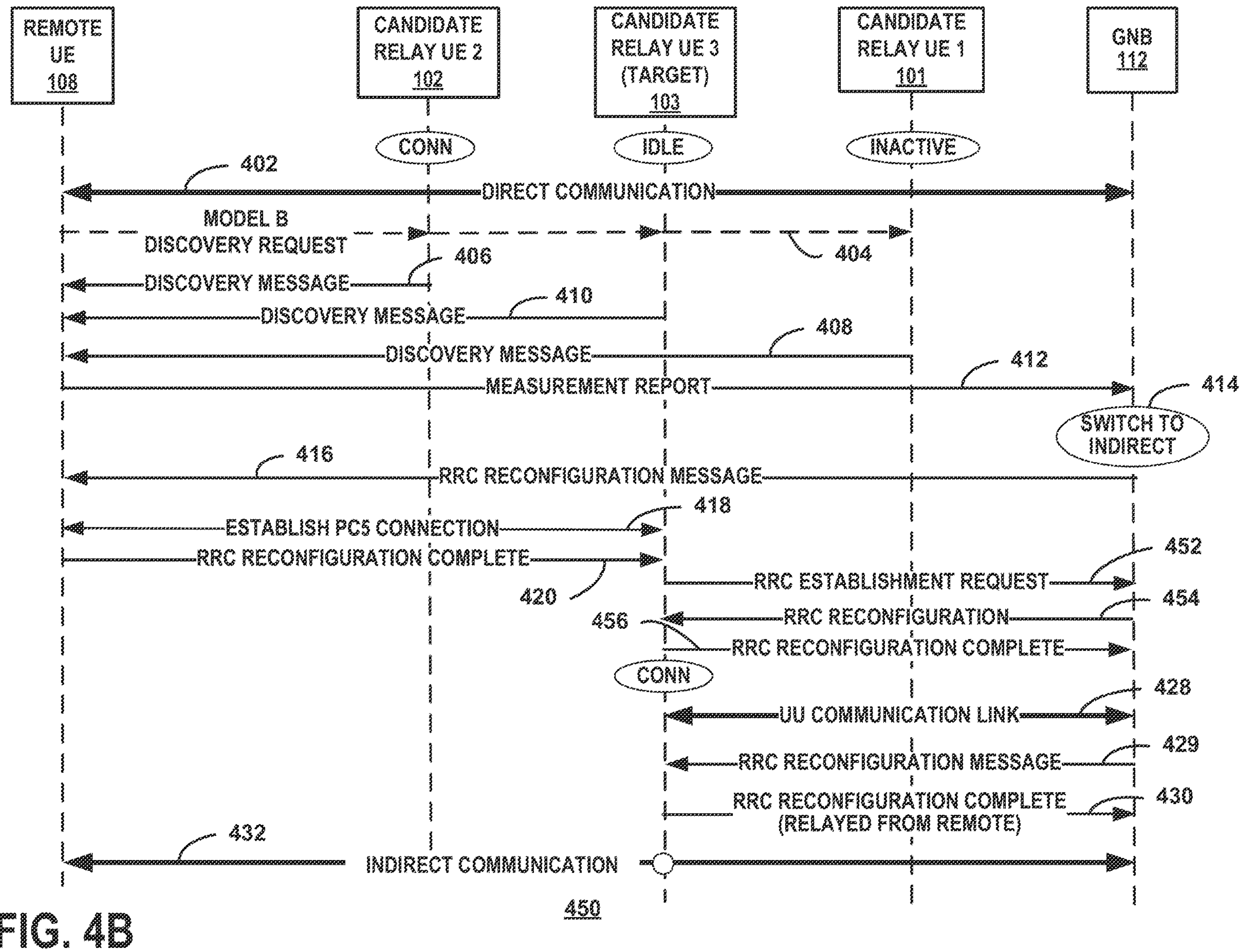
FIG. 4B is a message diagram for an example of relay link management for direct to indirect path switching where the target relay UE device is in RRC IDLE.

FIG. 4B is a message diagram 450 for an example of relay link management for direct to indirect path switching where the target relay UE device is in RRC IDLE. Although FIG. 4B shows three candidate relay UE devices 101-103, any number of candidate relay devices may be involved in the messaging. The example begins with the remote UE device 108 in direct communication 402 with the base station (gNB) 112 and with the first candidate relay UE device 101 in the RRC inactive state (RRC INACTIVE), the second candidate relay UE device 102 in the RRC Connected state (RRC CONN), and the third candidate relay UE device 103 in the RRC idle state (RRC IDLE). Uplink data and downlink data are exchanged between the remote UE device 108 and the gNB 112 over the direct Uu communication link 402.

At transmission 404, a Model B discovery request is sent from the remote UE device 108 to the nearby candidate relay UE devices. In some situations, the Model B discovery request may be omitted. Accordingly, the arrow representing the Model B discovery request is illustrated with a dashed line to indicate that the transmission may not be needed. For example, where Model A discovery messages are received from the candidate relay UE devices, the Model B request may not be needed.

At transmission 406, a discovery message is sent from the candidate relay UE device 102. At transmission 408, a discovery message is sent from the candidate relay UE device 101. At transmission 410, a discovery message is sent from the candidate relay UE device 103. The discovery messages of the transmissions 406, 408, 410 may be Model A discovery announcement messages or may be Model B discovery response messages. The remote UE device 108 receives the discovery messages and evaluates received signals and information as part of the relay reselection procedure. For the examples, the remote UE device 108 measures the SD-RSRP levels of the received discovery messages.

At transmission 412, the remote UE device sends a measurement report to the gNB 112 where the measurement report includes signal quality measurements for candidate relay devices. Accordingly, the measurement report includes the signal quality measurements, such as the SD-RSRP levels, of the discovery signals 406, 408, 410.

At event 414, the gNB 112 determines that communication with the remote UE device 108 should be switched from a direct connection to an indirect connection via a target relay UE device. The decision by the gNB 112 to switch to indirect communication may be based on any combination of factors, such as which event triggered the measurement reporting, the SD-RSRP level(s), the RRC connection status, and the congestion level of the candidate relay UE (the gNB may know how many remote UE devices are already connected to a particular candidate relay UE). For the example of FIG. 4B, the gNB 112 selects the candidate relay UE device (UE 3) 103 as the target UE device.

At transmission 416, the gNB 112 transmits an RRC Reconfiguration message to the remote UE device 108. The RRC Reconfiguration message initiates the switch from the direct communication link 402 to an indirect communication link via the target candidate relay UE device 103.

At event 418, a PC5 connection is established between the remote UE device 108 and the target candidate relay UE device 103. In some situations, the PC5 connection may already be established and event 418 is not needed.

At transmission 420, the remote UE device 108 sends an RRC Reconfiguration Complete message intended for the gNB 112 via the candidate relay UE device 103. The RRC Reconfiguration Complete message 420 is received at the target relay UE device 103 over the PC5 link.

In response to receiving the RRC Reconfiguration Complete message 420, the target relay UE device 103 begins the RRC establishment procedure by transmitting an RRC Establishment Request at transmission 452.

The target relay UE device 103 and gNB 112 exchange messages to establish RRC CONN. For the example, the gNB 112 sends an RRC Reconfiguration message at transmission 454, and the target relay UE device 103 sends an RRC Reconfiguration Complete message 456. When the target relay UE device 103 is in RRC CONN, a Uu communication link 428 is established between the target relay UE device 103 and gNB 112. At transmission 429, the gNB 112 sends an RRC Reconfiguration message to the target relay UE device 103 to configure both the sidelink RLC configuration, the RLC configuration in the Uu link and the remote UE ID to be used for the relay operation.

The target relay UE device 103 relays the RRC Reconfiguration Complete message received from the remote UE device 108 to the gNB 112 at transmission 430. Communication between the remote UE device 108 and the gNB 112 continues over the indirect communication link 432 which includes a relay connection through the relay UE device 103.

Figure 5:
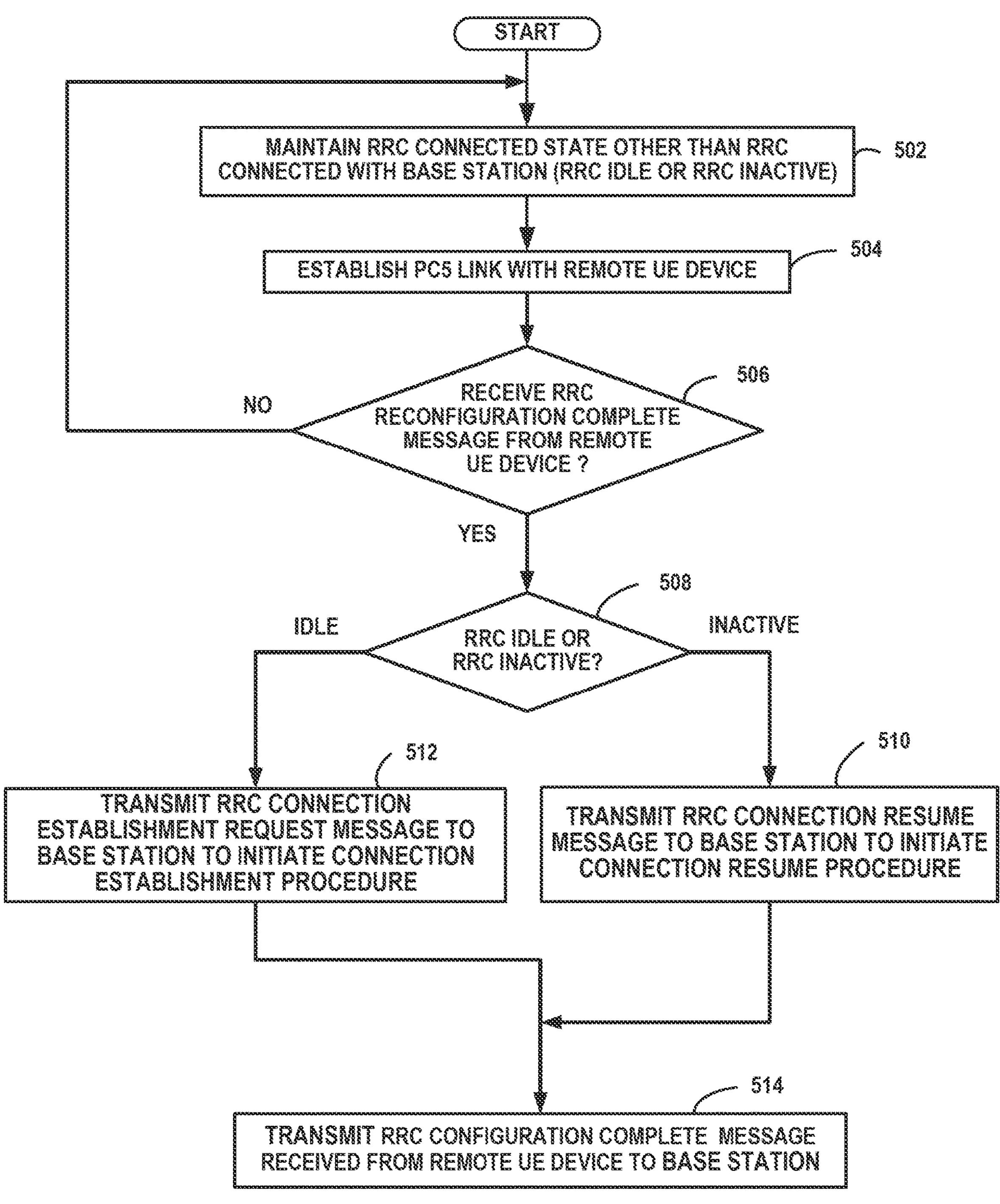
FIG. 5 is a flow chart of an example of a method of managing path switching from direct to indirect communication links.

FIG. 5 is a flow chart of an example of a method of managing path switching from direct to indirect communication links. The method is performed by UE device that can provide relay service to one or more remote UE devices and is in an RRC connection state other than RRC CONN. For the example, therefore, the method may be performed by a candidate relay UE device such as the candidate relay UE device (UE1) 101 and the candidate relay UE device (UE3) 103.

At step 502, an RRC connection state other than RRC CONN is maintained with a base station 112. For the example, therefore, the candidate relay UE device maintains RRC IDLE or RRC INACTIVE.

At step 504, a PC5 link is established with remote UE device 108. For the example, the candidate relay UE device receives a message in accordance with one or more revisions of the 3GPP communication specification to initiate the PC5 link.

At step 506, it is determined whether an RRC Reconfiguration Complete message is received from the remote UE device 108. The destination of the RRC Reconfiguration Complete is the base station 112. For the example, the relay UE device determines if SL-RLC1 from the remote UE device 108 has been received since the RRC Reconfiguration Complete is sent on the SL-RLC1 channel. If no RRC Reconfiguration Complete message is received from the remote UE device 108, the method returns to step 502. Otherwise, the method proceeds to step 508.

At step 508, it is determined whether the candidate relay UE device is in RRC IDLE or RRC INACTIVE. If the candidate relay UE device is in RRC INACTIVE, the method continues at step 510. If the candidate relay UE device is in RRC IDLE, the method continues at step 512.

At step 510, the relay UE device sends an RRC Resume Request message to the gNB 112. When in INACTIVE, therefore, the relay UE device initiates the connection resume procedure in response to receiving the RRC Reconfiguration Complete message from the remote UE device 108.

At step 512, the relay UE device sends an RRC Establishment Request message to the gNB 112. When in IDLE, therefore, the relay UE device initiates the connection establishment procedure in response to receiving the RRC Reconfiguration Complete message from the remote UE device 108.

After the relay UE device is in RRC CONN, the relay UE device relays the RRC Reconfiguration Complete message that was received from the remote UE device to the gNB 112 at step 514. Communication between the remote UE device 108 and gNB 112 continues over the indirect path through the relay UE device.

The techniques described above at least provide a mechanism for switching from in direct communication to indirect communication through a candidate relay UE device that is in an RRC connection state other than RRC CONN. When the relay UE device is in IDLE or INACTIVE, the relay UE device initiates a procedure to transition to RRC CONN in response to receiving an RRC Reconfiguration Complete message from a remote UE device.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A relay user equipment (UE) device comprising:

a controller configured to maintain the relay UE device in a Radio Resource Control (RRC) state with a base station other than RRC Connected (RRC CONN);

a receiver configured to receive an RRC Reconfiguration Complete message directed to the base station from a remote UE device over a PC5 communication link; and a transmitter configured to:

transmit, in response to receiving the RRC Reconfiguration Complete message, a first RRC message used for RRC Connection Establishment to the base station when the relay UE device is in an RRC IDLE state, transmit, in response to receiving the RRC Reconfiguration Complete message, a second RRC message used for RRC Connection Resume to the base station when the relay UE device is in an RRC INACTIVE state, and transmit the RRC Reconfiguration Complete message to the base station over a Uu communication link available in response to one of the first RRC message and the second RRC message.

2. The relay UE device of claim 1, wherein the RRC Reconfiguration Complete message is transmitted by the remote UE device in response to receipt of an RRC Reconfiguration message at the remote UE device transmitted from the base station over a Uu direct communication link between the base station and the remote UE device, the RRC Reconfiguration message initiating a path switch from a direct communication link between the remote UE device and the base station to an indirect communication link between the remote UE device and the base station through the relay UE device.

3. The relay UE device of claim 1, wherein:

the receiver is further configured to receive an RRC Resume message after transmitting the second RRC message, and the transmitter is further configured to transmit an RRC Resume Complete message after receiving the RRC Resume message.

4. The relay UE device of claim 1, wherein the transmitter and receiver are configured to operate in accordance with at least one revision of the 3rd Generation Partnership Project (3GPP) New Radio (NR) V2X communication specification.

5. A remote user equipment (UE) device comprising:

a transmitter configured to transmit a measurement report over a direct Uu communication link to a base station, the measurement report comprising a measurement of a signal transmitted from at least one candidate relay UE device in a Radio Resource Control (RRC) state other than RRC Connected (RRC CONN); and a receiver configured to receive, from the base station over the direct Uu communication link, an RRC Reconfiguration Message identifying a target relay UE device selected from the at least one candidate relay UE device by the base station, the target relay UE device in the RRC state other than RRC Connected (RRC CONN), the transmitter further configured to transmit an RRC Reconfiguration Complete message to the base station by transmitting the RRC Reconfiguration Complete message to the target relay UE device over a PC5 communication link, the RRC Reconfiguration Complete message invoking the target relay UE device to perform RRC Connection Establishment with the base station when the target relay UE device is in an RRC IDLE state, the RRC Reconfiguration Complete message invoking the target relay UE device to perform RRC Resume with the base station when the target relay UE device is in an RRC INACTIVE state.

6. The remote UE device of claim 5, wherein the signal is a Sidelink Discovery message.

7. The remote UE device of claim 5, wherein:

the measurement report comprises at least one measurement for the at least one candidate relay UE device, each measurement of the at least one measurement corresponding to a different candidate relay UE device of the at least one candidate relay UE device, and the at least one candidate relay UE device includes a first candidate relay UE device in RRC CONN and the target relay UE device in the RRC state other than RRC Connected (RRC CONN).

8. The remote UE device of claim 5, wherein the transmitter and receiver are configured to operate in accordance with at least one revision of the 3rd Generation Partnership Project (3GPP) New Radio (NR) V2X communication specification.

9. The relay UE device of claim 1, the receiver is configured to receive a RRC Reconfiguration message from the base station in response to the transmitter transmitting the first RRC message to the base station, and the controller is configured to switch the relay UE device to RRC Connected (RRC CONN) in response to the receiver receiving the RRC Reconfiguration message.

10. The relay UE device of claim 1, wherein the controller is configured to switch the relay UE device to RRC Connected (RRC CONN) in response to the transmitter transmitting the first RRC message to the base station, and the receiver is configured to receive a RRC Reconfiguration message from the base station in response to the transmitter transmitting the first RRC message to the base station.

11. The relay UE device of claim 10, wherein the RRC Reconfiguration message includes an identifier of the remote UE device.

12. The relay UE device of claim 1, wherein the controller is configured to switch the relay UE device to RRC Connected (RRC CONN) in response to the transmitter transmitting the second RRC message to the base station, and the receiver is configured to receive a RRC Reconfiguration message from the base station in response to the controller switching the relay UE device to RRC Connected (RRC CONN).

13. The relay UE device of claim 12, wherein the RRC Reconfiguration message includes an identifier of the remote UE device.

14. A method of a relay user equipment (UE) device, the method comprising:

in a Radio Resource Control (RRC) state with a base station other than RRC Connected (RRC CONN), receiving an RRC Reconfiguration Complete message directed to the base station from a remote UE device over a PC5 communication link;

transmitting, in response to receiving the RRC Reconfiguration Complete message, a first RRC message used for RRC Connection Establishment to the base station when the relay UE device is in an RRC IDLE state;

transmitting, in response to receiving the RRC Reconfiguration Complete message, a second RRC message used for RRC Connection Resume to the base station when the relay UE device is in an RRC INACTIVE state; and transmitting the RRC Reconfiguration Complete message to the base station over a Uu communication link available in response to one of the first RRC message and the second RRC message.

15. A computer-readable recording medium having embodied thereon computer-readable instructions which, when executed by a processor, cause the processor to perform the method of claim 14.

16. A chipset of a relay user equipment (UE) device, the chipset comprising:

a memory configured to store computer-readable instructions; and a processor configured to execute the computer-readable instructions and, when executing the computer-readable instructions, the processor is configured to execute a method including:

in a Radio Resource Control (RRC) state with a base station other than RRC Connected (RRC CONN), receiving an RRC Reconfiguration Complete message directed to the base station from a remote UE device over a PC5 communication link;

transmitting, in response to receiving the RRC Reconfiguration Complete message, a first RRC message used for RRC Connection Establishment to the base station when the relay UE device is in an RRC IDLE state;

transmitting, in response to receiving the RRC Reconfiguration Complete message, a second RRC message used for RRC Connection Resume to the base station when the relay UE device is in an RRC INACTIVE state; and transmitting the RRC Reconfiguration Complete message to the base station over a Uu communication link available in response to one of the first RRC message and the second RRC message.

17. A method of a remote user equipment (UE) device, the method comprising:

transmitting a measurement report over a direct Uu communication link to a base station, the measurement report comprising a measurement of a signal transmitted from at least one candidate relay UE device in a Radio Resource Control (RRC) state other than RRC Connected (RRC CONN);

receiving, from the base station over the direct Uu communication link, an RRC Reconfiguration Message identifying a target relay UE device selected from the at least one candidate relay UE device by the base station, the target relay UE device in the RRC state other than RRC Connected (RRC CONN);

transmitting an RRC Reconfiguration Complete message to the base station by transmitting the RRC Reconfiguration Complete message to the target relay UE device over a PC5 communication link, the RRC Reconfiguration Complete message invoking the target relay UE device to perform RRC Connection Establishment with the base station when the target relay UE device is in an RRC IDLE state, the RRC Reconfiguration Complete message invoking the target relay UE device to perform RRC Resume with the base station when the target relay UE device is in an RRC INACTIVE state.

18. A computer-readable recording medium having embodied thereon computer-readable instructions which, when executed by a processor, cause the processor to perform the method of claim 17.

19. A chipset of a remote user equipment (UE) device, the chipset comprising:

a memory configured to store computer-readable instructions; and a processor configured to execute the computer-readable instructions and, when executing the computer-readable instructions, the processor is configured to execute a method including:

transmitting a measurement report over a direct Uu communication link to a base station, the measurement report comprising a measurement of a signal transmitted from at least one candidate relay UE device in a Radio Resource Control (RRC) state other than RRC Connected (RRC CONN);

receiving, from the base station over the direct Uu communication link, an RRC Reconfiguration Message identifying a target relay UE device selected from the at least one candidate relay UE device by the base station, the target relay UE device in the RRC state other than RRC Connected (RRC CONN);

transmitting an RRC Reconfiguration Complete message to the base station by transmitting the RRC Reconfiguration Complete message to the target relay UE device over a PC5 communication link, the RRC Reconfiguration Complete message invoking the target relay UE device to perform RRC Connection Establishment with the base station when the target relay UE device is in an RRC IDLE state, the RRC Reconfiguration Complete message invoking the target relay UE device to perform RRC Resume with the base station when the target relay UE device is in an RRC INACTIVE state.

20. A system comprising:

a remote user equipment (UE) device; and a relay UE device, wherein the remote UE device includes:

a transmitter configured to transmit a measurement report over a direct Uu communication link to a base station, the measurement report comprising a measurement of a signal transmitted from at least one candidate relay UE device in a Radio Resource Control (RRC) state other than RRC Connected (RRC CONN); and a receiver configured to receive, from the base station over the direct Uu communication link, an RRC Reconfiguration Message identifying the relay UE device as a target relay UE device selected from the at least one candidate relay UE device by the base station, the target relay UE device in the RRC state other than RRC Connected (RRC CONN), the transmitter further configured to transmit an RRC Reconfiguration Complete message to the base station by transmitting the RRC Reconfiguration Complete message to the target relay UE device over a PC5 communication link, the RRC Reconfiguration Complete message invoking the target relay UE device to perform RRC Connection Establishment with the base station when the target relay UE device is in an RRC IDLE state, the RRC Reconfiguration Complete message invoking the target relay UE device to perform RRC Resume with the base station when the target relay UE device is in an RRC INACTIVE state, and wherein the relay UE device includes:

a receiver configured to, in the Radio Resource Control (RRC) state with the base station other than RRC Connected (RRC CONN), receive the RRC Reconfiguration Complete message directed to the base station from the remote UE device over the PC5 communication link; and a transmitter configured to:

transmit, in response to receiving the RRC Reconfiguration Complete message, a first RRC message used for RRC Connection Establishment to the base station when the relay UE device is in an RRC IDLE state, transmit, in response to receiving the RRC Reconfiguration Complete message, a second RRC message used for RRC Connection Resume to the base station when the relay UE device is in an RRC INACTIVE state, and transmit the RRC Reconfiguration Complete message to the base station over a Uu communication link available in response to one of the first RRC message and the second RRC message.

* * * * *